United States Patent [19]

Laxo

[11] 4,197,653
[45] Apr. 15, 1980

[54] ELECTRONIC SEXTANT

[76] Inventor: Darryl E. Laxo, 10 Zanco Way, Novato, Calif. 94947

[21] Appl. No.: 864,354

[22] Filed: Dec. 27, 1977

[51] Int. Cl.² .............................................. G01C 17/34
[52] U.S. Cl. ........................................ 33/268; 33/282
[58] Field of Search ................. 33/268, 269, 276, 277, 33/278, 282; 73/136 C; 310/338

[56] References Cited

U.S. PATENT DOCUMENTS

| | | | |
|---|---|---|---|
| 2,454,264 | 11/1948 | Stigter | 310/338 |
| 3,571,567 | 12/1969 | Eckermann | 33/268 |
| 3,968,570 | 7/1976 | Leuchter | 33/268 |

FOREIGN PATENT DOCUMENTS 21521  7/1961  German Democratic Rep. .. 73/136 C

*Primary Examiner*—Steven L. Stephan
*Attorney, Agent, or Firm*—R. S. Sciascia; Charles D. B. Curry

[57] ABSTRACT

An apparatus to be mounted on conventional sextants permitting faster, more accurate readings with memory storage capability. Alternative transducing means are attached to a sextant arm and generate electronic signals corresponding to amount of rotation of the arm. An electronic timing circuit is coupled to the angle signal generator such that both angle and time may be displayed instantaneously in digital format or stored for later display. Multiple memory circuits allow multiple sextant readings and times to be consecutively taken and stored without requiring separate acts of manual data recordation by the operator after each sighting.

5 Claims, 5 Drawing Figures

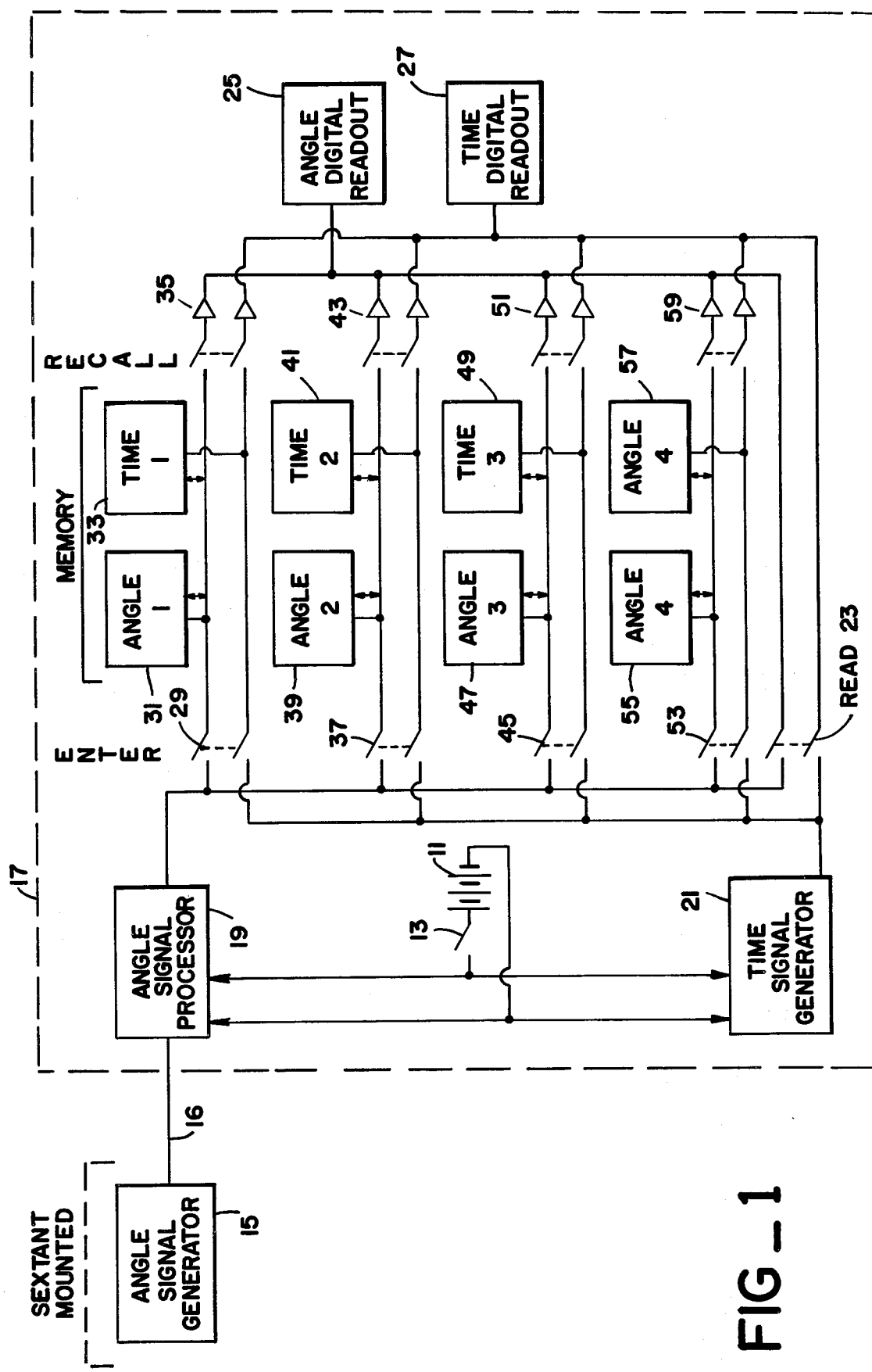

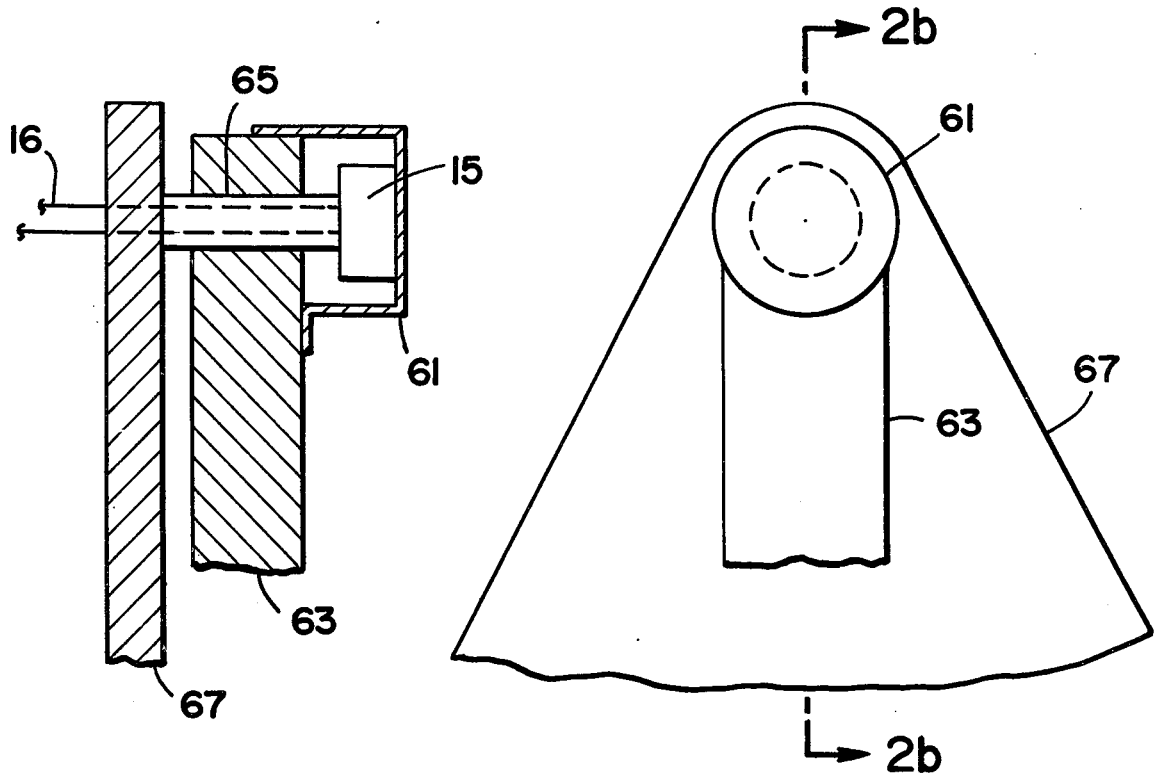
FIG_2b
FIG_2a
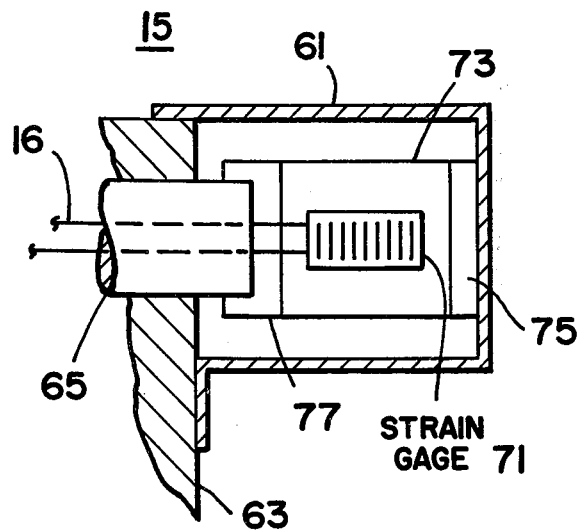
FIG_3
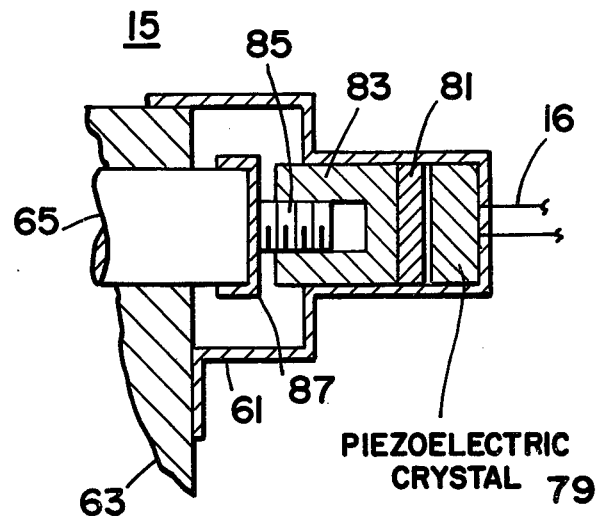
FIG_4

ELECTRONIC SEXTANT

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

This invention relates generally to hand-held navigation instruments and particularly to sextants. Most particularly, the invention relates to an apparatus attached to a sextant permitting consecutive instantaneous readings of angle and time of sighting and storage of these readings without separate manual recordation after each sighting.

2. Description of the Prior Art

Modern sextants are changed very little in their mechanical design and use from those used by early mariners. Traditionally, it is a hand-held, quadrant-shaped frame with an arm rotatably connected to the center of the quadrant circle and fastenable around the circumference of the circle which is graduated in degrees, minutes, and seconds. Cooperating with the arm to generate an elevation angle is a tiltable mirror allowing the sextant operator to bring the reflected image of a sighted celestial body into coincidence with the sight line of the horizon. The sextant, held to the eye while sighting the body, is then lowered and the angle of arm rotation required to achieve coincidence is read from the circle. The time at which the sighting occurred is also recorded with the sighted elevation angle for future computations.

The recommended procedure for maximum accuracy when using a sextant is to take sightings of at least three celestial bodies and preferably at least five sightings of each body. Generally, lighting conditions are very poor and the craft upon which the operator is located is moving in pitch, roll, and yaw. Further, the sighted object may be subject to obscuration by fog, clouds, etc. and during the angle/time recordation process it may disappear prohibiting further sightings or, if faint, it may be overloaded and another faint body mistakenly recorded upon subsequent sightings. Thus, even with a helper to record angle/time measurements, sextant operation is frequently crude, awkward and inaccurate. The instant invention is directed to providing accurate multiple angle/time sighting data without repositioning and recordation error.

An additional source of error common to all prior and conventional sextants is the manner in which the sighting angle is generated and measured. Amount of rotation of the shaft to which the pivot arm is affixed is the sole measure of elevation or sighting angle. The angle is sometimes read directly from the indicia marked on the quadrant circumference. In other embodiments, a gear reduction system connected to the shaft displays the generated angle elsewhere on the sextant or on some remote display device. The accuracy of such gear reduction systems, however, is dependent upon the coupling tolerances of the numerous gears, moisture, temperature and the like. More direct and more accurate means not subject to these sources of error are available and the instant invention is further directed to employment of these unique angle generator means.

Yet another source of error common to all conventional sextants is the method by which time data is provided and recorded with the angle data. Most time data is taken from a timepiece separate from the sextant and read after the sighting angle is taken. Some sextants provide a timepiece on the sextant but the sextant must still be taken from the eye after each sighting and serial readings of elevation angle and time taken. The instant invention is yet further directed to providing time recordation simultaneous with angle recordation.

SUMMARY OF THE INVENTION

Briefly, the present invention comprises an apparatus to be mounted on conventional sextants permitting faster, more accurate readings with memory storage capability. Alternative transducing means are attached to a sextant arm and generate electronic signals corresponding to amount of rotation of the arm. An electronic timing circuit is coupled to the angle signal generator such that both angle and time may be displayed instantaneously in digital format or stored for later display. Multiple memory circuits allow multiple sextant readings and times to be consecutively taken and stored without requiring separate acts of manual data recordation by the operator after each sighting.

BRIEF DESCRIPTION OF THE DRAWINGS

FIG. 1 illustrates the electronic circuit schematic for the device to be attached to the sextant;

FIGS. 2(a) and 2(b) illustrate how the instant invention is mounted upon a conventional sextant;

FIG. 3 shows a first embodiment of an angle signal generator;

FIG. 4 shows a second embodiment of an angle signal generator.

DESCRIPTION OF THE PREFERRED EMBODIMENT

The invention consists of an angle signal generator mounted upon a conventional sextant and an information processing circuit electrically connected to the angle signal generator. The information processing circuit may be remotely mounted and includes a power supply, a timing signal generator, an angle signal processor, multiple addressable memory units and a read-out display.

FIG. 1 shows a schematic of the electronic circuit of the instant invention. The power supply 11, typically a battery, provides power to the instant invention by activation of switch 13. The angle signal generator 15 is mounted on a sextant, not shown, and the output signal of the angle signal generator 15 is applied through electrical lead wires 16 to the information processing circuit 17 in which data is processed and then read out immediately or stored for later recall.

Receiving and converting the generated angle signal for display is angle signal processor 19 which outputs a processed angle signal in parallel with an outputted time signal from time signal generator 21 to READ switch 23. Activation of READ switch 23 causes the processed angle signal and the time signal to be displayed on angle digital readout 25 and time digital readout 27 respectively.

Also included in information processing circuit 17 are a plurality of identical addressable memory units. These are characterized by data entry switches 29, 37, 45 and 53, angle signal memory cells 31, 39, 47 and 55, time signal memory cells 33, 41, 49 and 57 and data recall switches 35, 43, 51 and 59. In typical operation, output signals from the angle signal processor 19 and the time signal generator 21 are continuously applied to the normally open data entry switch 29. Closure of data entry switch 29 causes the instantaneously applied angle and time signals to be stored in angle memory cell 31 and time memory cell 33 respectively. Closure of normally open data recall switch 35 causes the angle and time values stored in memory to be displayed on angle digital readout 25 and time digital readout 27 respectively. The other memory units are operated similarly.

FIGS. 2(a) and 2(b) show plane and cross-section views respectively of the instant invention attached to a conventional sextant. The angle signal generator 15 is mounted between an enclosing cover 61 attached to the sextant arm 62 and the pivot pin 65. The sextant arm 63 rotates about the pivot pin 65 which is connected to the sextant frame 67. A pair of electrical leads 16 transmit the electrical signal produced by the angle signal generator 15.

FIG. 3 shows one embodiment of the angle signal generator 15. A strain gage 71 is mounted upon a flexible metal sheet 73 having a sheet 73-to-cover 61 attachment 75 and a sheet 73-to-pivot-pin 65 attachment 77. Distortion of the sheet causes the gage to generate an electrical signal.

FIG. 4 shows a second embodiment of the angle signal generator 15. Located just inside and attached to the cover 61 is a piezoelectric crystal 79 also attached to a Belleville spring and washer 81. This, in turn is attached to a compressor 83 mounted upon a threaded shaft 85 which has a shaft 85-to-pivot 65 attachment 87 coupling it to the pivot pin 65 of the sextant. Compression of the piezoelectric crystal causes it to generate an electrical signal.

With the digital readouts of time and angle simultaneously stored or displayed at the instant the data entry or READ switches respectively are activated, there will be no recordation error. Capability to rapidly sight several bodies or one body several times without manual recordation between sightings greatly facilitates handling and accuracy of the sextant.

Obviously, numerous modifications and variations of the present invention are possible in view of the teachings above. Such modifications and variations are understood to be within the scope of the appended claims.

What is claimed is:

1. An electronic sextant comprising:
   (a) sextant having at least one arm, a main body, and a pivot pin, said pivot pin connected to said main body and said arm rotatably connected to said pivot pin;
   (b) angle signal generator generating an electronic angle signal resulting from rotation of said arm on said sextant, said angle signal generator detachably mounted on said arm;
   (c) means for attaching one side of said angle signal generator to said pivot pin of said sextant;
   (d) means for fastening the other side of said angle signal generator to said arm of said sextant, said fastening means fixably enclosing said angle signal generator upon said arm;
   (e) transducer connected to said angle signal generator and between said attaching means and said fastening means, said transducer outputting an electrical signal corresponding to amount of rotation of said arm about said pivot pin;
   (f) electronic timing circuit for generating an electronic timing signal, said timing circuit connected to said angle signal generator and generating an output signal;
   (g) means for processing said output signal of said transducer and said electronic timing circuit output signal, said processing means generating an output signal;
   (h) a plurality of paired memory storage registers for instantaneously and selectively receiving said electronic timing signal and said output signal from said processing means, each pair of said memory storage registers storing said received output signal and said received electronic timing signal for selective recall; and
   (i) digital readout for selectively displaying said output signal of said processing means and said electronic timing signal stored in each of said paired memory storage registers.

2. An electronic sextant as recited in claim 1 wherein said transducing means includes:
   (a) flexible metal sheet; and
   (b) strain gage fixably mounted upon said sheet.

3. An electronic sextant as recited in claim 1 wherein said transducing means includes:
   (a) threaded shaft mounted upon the aforesaid attaching means;
   (b) compressor threaded upon said threaded shaft;
   (c) spring and washer mounted upon said compressor; and
   (d) piezoelectric crystal mounted upon said washer and attached to an enclosing cover means which in turn is attached to said arm of said sextant.

4. An electronic sextant as recited in claim 1 wherein said processing means includes:
   (a) power supply;
   (b) signal processor connected to and receiving the outputs of said angle signal generator, said electronic timing circuit and said power supply, said processor converting said outputs for selective storage in said paired memory storage registers;
   (c) means for manually selectively entering said converted outputs into said paired memory storage registers, said entering means selectively connected between each of said paired memory storage registers and said signal processor; and
   (d) means for manually recalling said converted outputs stored in said paired memory storage registers, said recalling means connected between said paired memory storage registers and said digital readout.

5. A device for measuring and displaying the angle between two rotatably connected members and the time associated with the measurement comprising:
   (a) means for producing an electronic angle signal resulting from angular displacement between said rotatably connected members, said producing means detachably mounted upon one of said members;
   (b) means for generating an electronic time signal, said generating means electrically parallel connected to said angle means;
   (c) means for processing said electronic angle signal, said processing means receiving as input said electronic angle signal and said electronic time signal and having an output;

(d) a plurality of switches connected in parallel to said generating means and processing means, each of said switches connected to paired memory storage registers such that selective and instantaneous associated values of said output of said processing means and said electronic time signal are stored by activation of any of said switches; and (e) means connected to each of said paired memory storage registers for selectively displaying said associated values of said output of said processing means and said electronic time signal.

* * * * *